(12) United States Patent
Newell

(10) Patent No.: US 8,713,604 B2
(45) Date of Patent: Apr. 29, 2014

(54) SYSTEMS AND METHODS FOR PROCESSING SUPPLEMENTAL INFORMATION ASSOCIATED WITH MEDIA PROGRAMMING

(75) Inventor: Nicholas Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 440 days.

(21) Appl. No.: 12/821,552

(22) Filed: Jun. 23, 2010

(65) Prior Publication Data
US 2011/0321114 A1   Dec. 29, 2011

(51) Int. Cl.
*H04N 7/10* (2006.01)
*H04N 7/025* (2006.01)
*H04N 7/16* (2011.01)

(52) U.S. Cl.
USPC ............... 725/36; 725/32; 725/135; 725/136; 725/137; 725/138; 725/139; 725/142

(58) Field of Classification Search
USPC ......................................................... 725/133
See application file for complete search history.

(56) References Cited

U.S. PATENT DOCUMENTS

| | | | |
|---|---|---|---|
| 5,982,411 A | 11/1999 | Eyer et al. | |
| 5,987,509 A * | 11/1999 | Portuesi | 725/113 |
| 6,115,074 A | 9/2000 | Ozkan et al. | |
| 6,993,789 B1 | 1/2006 | Sezan et al. | |
| 7,650,624 B2 | 1/2010 | Barsoum et al. | |
| 2002/0129383 A1* | 9/2002 | Wasilewski | 725/139 |
| 2003/0058367 A1* | 3/2003 | Sato et al. | 348/563 |
| 2003/0145338 A1* | 7/2003 | Harrington | 725/136 |
| 2004/0031052 A1* | 2/2004 | Wannamaker et al. | 725/61 |
| 2004/0103430 A1 | 5/2004 | Lee et al. | |
| 2004/0117858 A1 | 6/2004 | Boudreau et al. | |
| 2005/0132416 A1* | 6/2005 | Wasilewski | 725/133 |
| 2008/0240681 A1 | 10/2008 | Fukushima | |
| 2008/0244645 A1* | 10/2008 | Moon et al. | 725/37 |
| 2008/0254826 A1 | 10/2008 | Kwon | |
| 2009/0119704 A1* | 5/2009 | Dimitrova et al. | 725/38 |
| 2010/0295992 A1 | 11/2010 | Lee et al. | |

OTHER PUBLICATIONS

Advanced Television Systems Committee "Program Guide for Digital Television ATSC Standard," A Compilation of Advanced Television Systems Committee Standards, dated Jan. 3, 1996.
Advanced Television Systems Cmomittee "System Information for Digital Television ATSC Standard," dated Jan. 3, 1996.
Advanced Television Systems Committee "ATSC Digital Television Standard," dated Apr. 12, 1995 and Sep. 16, 1995.

(Continued)

*Primary Examiner* — Justin Shepard
(74) *Attorney, Agent, or Firm* — Ingrassia Fisher & Lorenz, P.C.

(57) ABSTRACT

Various systems and methods allow supplemental information such as recipes, parts lists, instructions, outlines or other information associated with a television program to be delivered in the same transport stream that carries the television program to the viewer. The transport stream includes at least two elementary streams, wherein the first elementary stream conveys video content associated with the television program and the second elementary stream conveys supplemental information that summarizes at least a portion of the television program. The device receiving the digital transport stream identifies the first and second elementary streams in the digital transport stream, processes the first elementary stream to present the video content associated with the television program to the viewer, and makes the supplemental information in the second elementary stream available to the viewer.

16 Claims, 3 Drawing Sheets

(56) References Cited

OTHER PUBLICATIONS

ABCDWIKI, ABRAM1977 et al. "MPEG Transport Stream," source http://en.wikipedia.org/w/index.php?oldid=363191399, undated.

European Broadcasting Union "Digital Video Broadcasting (DVB); Implementation Guidelines for Data Broadcasting," ETSI TR 101 202 v1.2.1, Jan. 2003.

Wikipedia, The Free Encyclopedia, "Data and Object Carousel," retrieved from the Internet on Jan. 31, 2011 at http://en.wikipedia.org/wiki/Object_carousel; page last modified on Jan. 22, 2011.

Wikipedia, The Free Encyclopedia, "DSM CC—Digital Storage Media Command and Control," retrieved from the Internet on Jan. 31, 2011 at http://en.wikipedia.org/wiki/DSM_CC; page last modified Oct. 18, 2010.

European Patent Office, "European Search Report" mailed Oct. 13, 2011; International Appln. No. 11171032.0-1247.

* cited by examiner

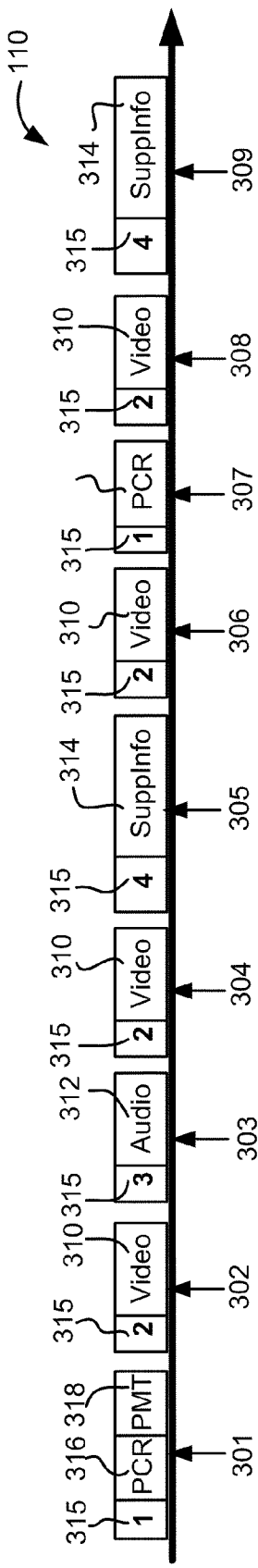
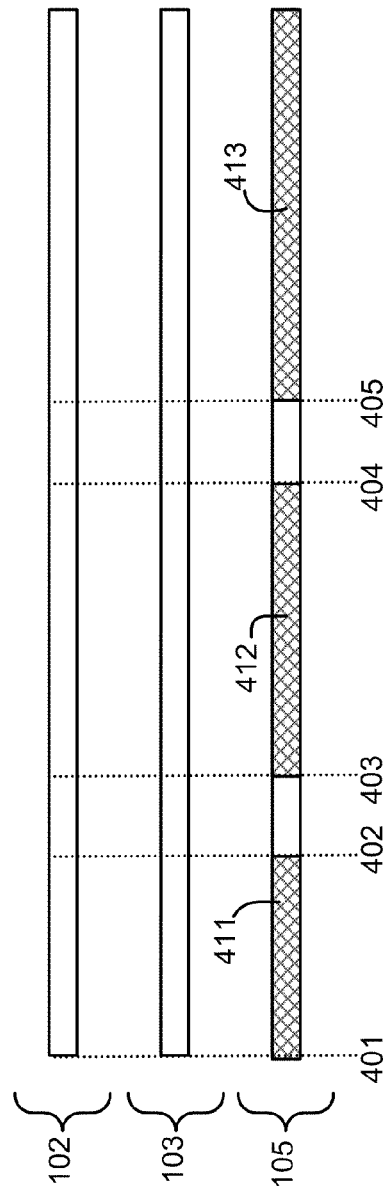
FIG. 3
FIG. 4

SYSTEMS AND METHODS FOR PROCESSING SUPPLEMENTAL INFORMATION ASSOCIATED WITH MEDIA PROGRAMMING

TECHNICAL FIELD

Various embodiments relate to the distribution of television or other media programming, and more particularly relate to systems, devices and/or methods for transmitting or receiving supplemental information that is associated with television programming.

BACKGROUND

Instructional television programming is becoming increasingly popular. In addition to the wide range of educational programming that is available on a variety of networks, many programs teach viewers about cooking, home repair, health, music or any number of other recreational topics. Many of the instructional programs now available provide a high level of instructional detail that allows viewers to develop relatively advanced skills or to complete relatively complex tasks without further assistance.

Often, however, television programs provide more information than most viewers can conveniently remember, at least without actively taking notes while viewing the program. A cooking program, for example, may have detailed lists of ingredients or instructions for preparing a particular recipe that may be difficult for many viewers to remember. Home repair programs may similarly present lists of parts or tools, or detailed instructions for completing a task that may be difficult to remember in full detail. Other programs, including non-instructional programs, may similarly provide detailed information about the programming content than the viewer may want to remember or access at a later date or time.

Often, Internet websites allow viewers to obtain recipes, parts lists or other information that is associated with broadcast programs. To access the website, however, the viewer typically needs to use a separate computer or other device other than the television, so the convenience and immediacy of watching a television program is lost. Moreover, if the audio or video portion of a program describes an Internet address, then the web site associated with the program typically needs to reside at that address for the entire life of the program, including syndication, reruns, etc. This can lead to administrative effort and cost to maintain websites at addresses described in programs that were originally broadcast many days, months or even years prior.

It is therefore desirable to create systems, devices and/or methods to provide or receive additional information associated with broadcast programming in a convenient manner. These and other desirable features and characteristics will become apparent from the subsequent detailed description and the appended claims, taken in conjunction with the accompanying drawings and this background section.

BRIEF SUMMARY

According to various exemplary embodiments, supplemental information associated with a television program is delivered in the same transport stream that carries the television program to the viewer. The transport stream includes at least two elementary streams, wherein the first elementary stream conveys video content associated with the television program and the second elementary stream conveys supplemental information relating to the television program. Supplemental information may provide any information related to the programming content, such as recipes, parts lists, health or fitness information, instructions, notes, summaries, outlines and/or any other information as desired.

Some embodiments relate to methods executable by a set top box or other television receiver that presents television programs to viewers. A digital transport stream associated with a television program is received at the receiver. The digital transport stream suitably comprises a multiplex of a first elementary stream and a second elementary stream, wherein the first elementary stream conveys video content associated with the television program and the second elementary stream conveys supplemental information that summarizes at least a portion of the television program. The first and second elementary streams are identified in the received digital transport stream. The first elementary stream is processed to thereby present the video content associated with the television program to the viewer, and the supplemental information in the second elementary stream is made available to the viewer. The information may be made available by presenting the supplemental information on the display, by extracting and storing at least some of the supplemental information for later retrieval, or in any other manner.

Other embodiments relate to systems that provide supplemental information associated with video content of a television program to a viewer. The system suitably comprises a programming interface configured to receive a transport stream associated with the television program, wherein the transport stream comprises a first elementary stream that conveys the video content of the television program and a second elementary stream that conveys supplemental information that summarizes at least a portion of the program, a display interface configured to provide output signals to a display that represent the video content, and a controller. The controller is configured to identify and extract the first and second elementary streams from the transport stream, to process the first elementary stream to thereby generate the output signals representing the video content for presentation to the viewer on the display, and to make the supplemental information from the second elementary stream available to the viewer.

Still other embodiments relate to methods of disseminating a television program. A plurality of elementary streams are created including a first elementary stream that conveys video content associated with the television program, a second elementary stream that conveys audio content associated with the television program and a third elementary stream that conveys supplemental information that summarizes at least a portion of television program. Each of the first, second and third elementary streams is associated with a unique program identifier. The first, second and third elementary streams are multiplexed to thereby create a transport stream associated with the television program. The transport stream and an index to the unique program identifiers associated with the first, second and third elementary streams are broadcasted to a plurality of viewers.

These and other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

FIG. 3 is a diagram showing one example of a time multiplexed transport stream containing supplemental information; and FIG. 4 is a timing diagram showing an example of chaptered supplemental information.

DETAILED DESCRIPTION

Figure 1:
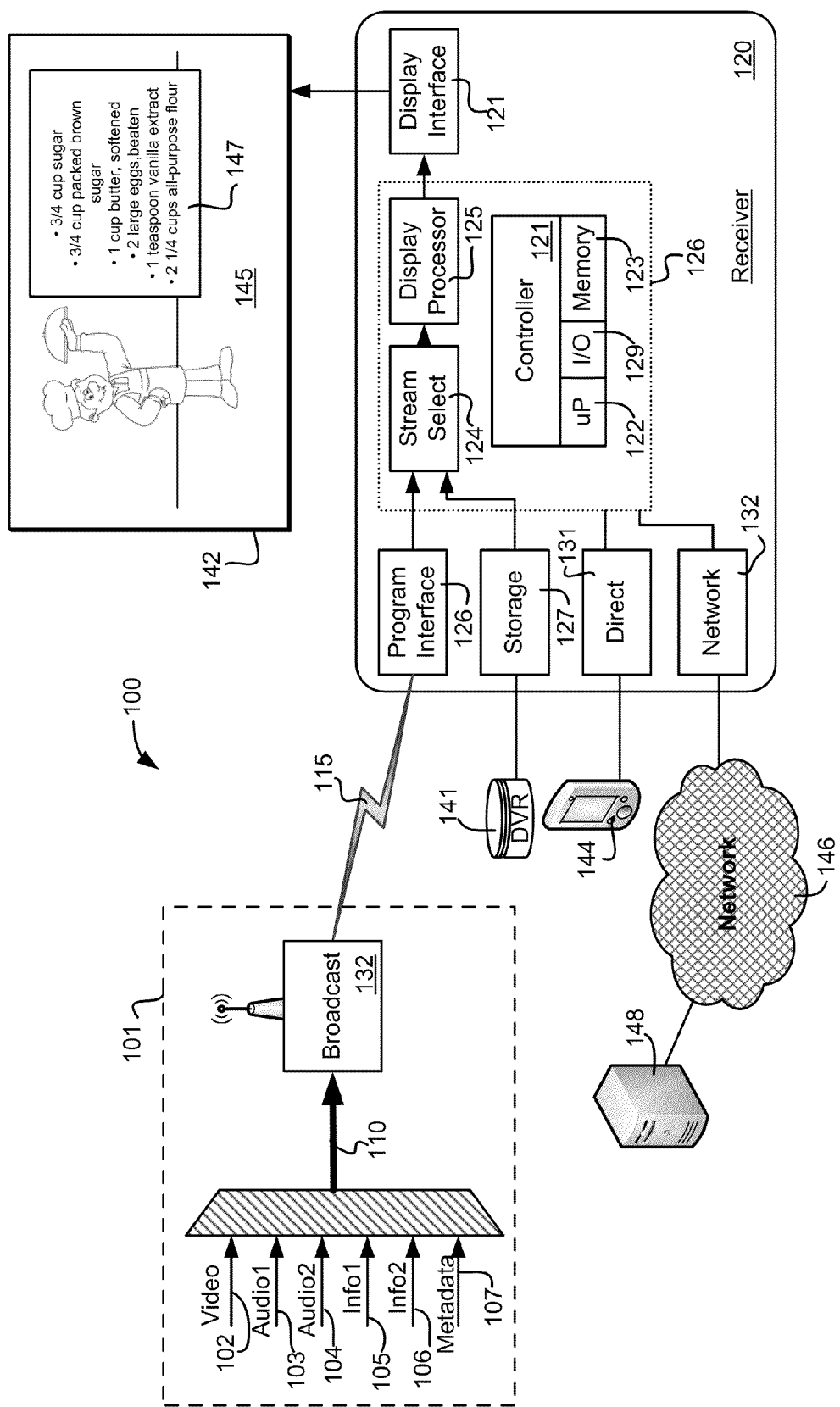
FIG. 1 is a diagram of an exemplary system for providing programming with supplemental information.

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, supplemental information that relates to a television programming content is delivered to a viewer as an elementary stream that can be transported in the same digital transport stream used to provide the video program content. The supplemental information may be delivered, for example, in an elementary packetized stream that is multiplexed with other elementary streams that convey video, audio or other data within a conventional MPEG transport stream. In such implementations, the supplemental information may be referenced within the transport stream multiplex using a conventional packet identifier (PID) similar to the other streams in the multiplex that provide audio, video or other content. Because the supplemental information is provided with the programming itself, the supplemental information is conveniently and readily available as the viewer receives the actual programming, thereby greatly improving the convenience to the viewer while reducing administrative effort by broadcaster or producer.

The supplemental information provided with any particular program may vary widely based upon the programming content, the intended viewer/customer, the capabilities of the receiving device, and any number of other factors. In various embodiments, the supplemental information provides summary or other useful information related to the content of the program itself. Such information may include, for example, recipes presented on a cooking show; lists of parts or tools used in a home improvement project; sheet music, chord charts, tablature, lyrics or other information presented in a musical instruction program; textual summaries or outlines of educational programs; lists of instructions or supplies needed for completing any task; health or fitness information; and/or the like. Other programs may provide any other sort of supplemental information as desired.

Supplemental information may be particularly useful in "how-to" or other educational programming wherein the viewer may want to remember a process or concept taught during the show. Other types of programming, however, could equivalently provide supplemental information of any kind. A sports program, for example, could provide statistics, standings, "fantasy" data, schedules of upcoming games or other information as part of a supplemental information stream. Commercials could include information about advertised products, links for additional information, coupons and/or any other information in a supplemental stream. Any type of television or other media programming could use the supplemental information stream to convey hyperlinks, formatted text (or imagery), media files and/or other information as desired.

An elementary supplemental information stream provided within the program transport stream can be used in various implementations and embodiments to realize any number of different benefits. For example, since the supplemental information may be conveniently received, stored and transmitted along with the audio or video programming itself, some embodiments may use the supplemental information contained within the elementary stream to facilitate convenient time and/or place shifting. Other embodiments may simply provide the supplemental information on the display along with the video programming to facilitate convenient review by the viewer. In some of these embodiments, the common timing features of the transport stream (e.g., the MPEG presentation time stamp (PTS) or program clock reference (PCR) features) can be used to synchronize the supplemental information with the presentation of the program audio/video content. Various "chapters" of supplemental information, for example, can be provided as the program progresses, thereby allowing information to be revealed to the viewer at times that it are most useful. Some implementations may also provide multiple supplemental information streams within the transport stream multiplex to facilitate different languages, varying levels of detail, or the like. Even further, the supplemental information may be formatted in some implementations to include hypertext, markup language, graphics, media files and/or the like. Other embodiments may provide additional or alternate features, as desired.

Turning now to the drawing figures and with initial reference to FIG. 1, television or other media programming is distributed in a digital transport stream 110 that is a multiplex of various elementary streams 102-107 containing video, audio, and supplemental content. In the illustrated example, a system 100 for delivering television programming to a viewer suitably includes a broadcaster 101 that provides the program transport stream 110 containing fundamental program streams 102-106 to a viewer's receiver 120 over a distribution channel 115. The receiver 120 is able to receive, decode and render the programming on a television or other suitable display 142. In some implementations, the supplemental information 147 is provided along with program video 145 on display 142. Supplemental information 147 may be alternately or additionally be provided by extracting the supplemental information for storage on a portable device 144 or digital video recorder 141, by transmitting or receiving information identified in the supplemental stream 105, 106 via network 146, and/or in any other manner.

In various embodiments, the program transport stream no is broadcast over any conventional distribution channel 115, such as any sort of terrestrial broadcast system, a cable television system, a direct broadcast satellite (DBS) system, or the like. In equivalent embodiments, distribution channel 115 may be transported over the Internet or another digital network 146 using any sort of file-based, stream-based, on-demand or other distribution technique. Broadcaster 101 therefore represents any source of programming represented by a transport stream 110 that is broadcast on any appropriate distribution channel 115. Examples of "broadcasters" 101 in different embodiments may include any sorts of television broadcast stations, cable distribution systems, DBS transmission systems, network distribution systems or the like.

Transport stream no suitably contains any number of elementary streams 102-106 each conveying audio, video, or other content associated with a particular program. Transport stream no is formed as a multiplex of various elementary streams that include a video stream (e.g., stream 102), one or more audio streams (e.g., streams 103 and 104), and one or more streams (e.g., streams 105-106) that convey supplemental information. In various embodiments, multiple audio and/or supplemental information streams can be provided within the multiplexed transport stream 110 to support different languages or other features. Generally, the viewer's receiver 120 is able to extract and process the desired streams based upon user preferences or the like, and any unused elementary streams provided within the multiplex are simply discarded. Although FIG. 1 shows transport stream no as being made up of five elementary streams 102-106, plus metadata 107, other streams not shown in FIG. 1 may be present. These streams may represent, for example, closed caption information, electronic program guide information, or any other information as desired. Additional information about an exemplary transport stream no is described below in conjunction with FIG. 3.

The various streams 102-106 may be organized and formatted in any manner. In various embodiments, elementary streams 102-106 are formatted as packetized elementary streams in accordance with any protocols promulgated by the Moving Picture Experts Group (MPEG), including MPEG2 or H.264/MPEG4, and/or the like. In this example, transport stream no is formatted as a conventional MPEG transport stream that includes any number of packetized elementary streams 102-106, as well as associated metadata 107, as desired. Each elementary stream 102-106 (including streams 105 and 106 that carry supplemental information) is referenced within an MPEG multiplex by a unique MPEG packet identifier (PID) provided within every packet of the elementary stream. Many equivalent embodiments may use other standard or non-standard protocols or formats other than MPEG to create streams 102-106 and/or transport stream 110, as desired.

Broadcaster 101 suitably multiplexes any number of elementary streams 102-106, along with any sort of metadata 107 that describes the elementary streams 102-106, to form transport stream 110. In various embodiments, broadcaster 101 multiplexes streams 102-106 in the time domain using any sort of conventional transport stream multiplexer 108, such as any of the various hardware or software MPEG multiplexers that are commercially available. Metadata 107 may include any information about the various elementary streams making up a particular program. Metadata 107 may include, for example, index of the identifiers associated with each elementary stream 102-106. A conventional MPEG program map table (PMT), for example, could provide the PIDs or other identifiers associated with the elementary streams 102-106 associated with a particular program. Equivalent embodiments may additionally or alternately provide index information using supplemental information (SIP) and/or other reference data as appropriate to identify the various streams 102-106 or programs contained within the transport stream 110. Still other embodiments may provide an index of program and/or stream mapping information outside of transport stream no in any manner. A cable, DBS or other television broadcaster may provide indexes of program and stream information within a separate electronic program guide (EPG) feature, for example, that is transmitted separately from the transport stream 110.

Metadata 107 may also include timing information, such as an MPEG program clock reference (PCR) or other clocking data that allows the various elementary streams 102-106 to share a common timing scheme. This common timing information may be used in various embodiments to synchronize "chapters" or other portions of the supplemental information provided on elementary streams 105, 106 to video or audio content provided on streams 102-104, as appropriate.

Streams 105-106 carrying supplemental information may be formatted using the same transport packet format, clocking information, PID structure and the like used to format elementary streams 102-104, although each stream 102-106 will typically have its own unique PID, and different streams may convey different types of payload data. The supplemental information contained within each stream 105-106, for example, may be formatted as ASCII text or the like within a payload data field of an elementary stream packet. This payload data may simply convey textual information that can be formatted and rendered by the receiver in some implementations. In further embodiments, the text conveyed in the payload field may be organized into higher-level formats such as HTML, XML or the like to facilitate a richer viewing experience of the supplemental information. Some implementations may include hyperlinks or the like, as described more fully below. Further, some implementations may supplement or replace conventional text provided in the supplemental information stream 105, 106 with other types of data (e.g., video or still images, or audio content) that may be renderable within an HTML or other web-type document, as desired.

As noted above, the multiplexed transport stream no is broadcast or otherwise transmitted to one or more receivers 120 via an appropriate medium 115. Transmission may be performed by any sort of transmitter 112, such as any satellite uplink, cable distribution system, terrestrial television broadcaster/transmitter, network distribution system, and/or the like. Since the supplemental information is provided on an elementary stream 105, 106 that is contained within the transport stream 110, any techniques or equipment used to distribute MPEG or other transport streams may be readily used to transmit the same streams 110 containing supplemental information.

The supplemental information may be received and provided to the viewer in any manner. In the example shown in FIG. 1, the viewer receives the transport stream 110 carrying desired television or other programming using any sort of appropriate receiver 120 system or device.

Receiver 120 is any sort of system, device or other component that includes appropriate hardware, software, firmware and/or other processing logic to implement the various functions related to receiving and presenting video programming to a viewer. Receiver 120 may be a conventional television receiver, for example, such as any type of set top box (STB) or similar system that receives programming content from a terrestrial broadcast, cable or satellite distributor for presentation on a television or other display 142. Other types of receivers 120 may receive and process programming received from network, stored media, broadcast and/or other sources as desired.

In the example shown in FIG. 1, receiver 120 suitably includes a controller 121 that interacts with a programming interface 126, a network interface 132, a storage interface 127 to a digital video recorder (DVR) 142 or the like, a display interface 128 to display 142, and/or a direct connect interface 131 to an external device 144. Various equivalent embodiments of receiver 120 may be implemented within any additional or alternate components or products or arrangements that may differ from those shown in FIG. 1.

Controller 121 suitably includes any sort of microprocessor, microcontroller, digital signal processor or other programmable hardware 122 capable of directing the actions and functions of receiver 120. Controller 121 typically obtains programming content received via program interface 126 and renders the video, audio and/or supplemental content contained within the demodulated transport stream 110 for output at display interface 128 and presentation on display 142. To that end, controller 121 identifies and extracts relevant elementary streams (including supplemental information streams 105, 106) within the received transport stream 110, generates appropriate output signal 130 to present video and/ or audio content on display 142, and also provides supplemental content to the viewer as desired. Controller 121 may further direct the storage or retrieval of programming content (including supplemental content) on a DVR 141 or the like, as well as any communications via direct interface 131 and/or network interface 132.

In various embodiments, controller 121 is based upon a "system on chip" (SoC) implementation that incorporates microcontroller hardware 122 with memory 123, input/output and other features to perform the various signal processing and other actions of receiver 120. Various SoC and other integrated video processing implementations are available from Texas Instruments, Conexant Systems, NXP Semiconductor, Broadcom Inc., and many other suppliers as appropriate. Other embodiments may implement controller 121 and/or the other features of receiver 120 with any number of separate processing components, such as any number of separate chips that provide specific functions (e.g., decoding, demodulation, decryption, transcoding and/or the like), as well as any additional memories 123, input/output interfaces 129 and/or other features as desired.

FIG. 1 shows an example that provides a stream decoder module 124, a display processor module 125 and a control module 121 each executing on SoC or other shared processing hardware 126. In this example, stream decoder module 124 is any hardware and/or software logic capable of decoding desired programming content from the available sources for presentation on one or more output interfaces 128. Stream select module 124 therefore responds to viewer inputs (received, e.g., via input/output module 129) to obtain, decompress or otherwise decode the programming received in a transport stream 110. Transport stream 110 may be received from any source, such as program interface 126, storage interface 127, network interface 132, and/or direct interface 131. In some embodiments, stream decoder module 124 is implemented using conventional MPEG or other decompression/decoding functions provided within SoC hardware 133. Other embodiments may use separate decoder/decompression logic, such as a separate decoder chip, to perform similar functions.

Display processor module 125 includes any appropriate hardware, software and/or other logic to create desired screen displays at interface 128 as desired. In various embodiments, display processor module 125 is able to decode and/or transcode the received media to a format that can be presented at display interface 128. The generated displays, including received/stored content and any other displays may then be presented to one or more output interfaces 228 in any desired format. In various embodiments, display processor 125 produces an output signal encoded in any standard format (e.g., ITU656 format for standard definition television signals or any format for high definition television signals) that can be readily converted to standard and/or high definition television signals at interface 128.

Display processing module 125 is also able to produce on screen displays (OSDs) for electronic program guide, setup and control, input/output facilitation user interface imagery and/or other features that may vary from embodiment to embodiment. Such displays are not typically contained within the received or stored broadcast stream, but are nevertheless useful to users in interacting with receiver 120 or the like. In particular, on-screen displays can be used in some implementations to provide supplemental information 147 to the viewer on display 142. The supplemental information 147 may be generated on the display, for example, to overlie the primary video programming 145, as shown in the example of FIG. 1. Alternately, the supplemental information 147 may be presented in a separate window from the primary video content 145, or in any other manner. Supplemental information 147 may be alternately provided in a separate screen from video content 145, as desired.

In the implementation of FIG. 1, programming interface 126 is any tuner, demodulator and/or other interface capable of receiving broadcast television, cable, DBS and/or other media programming as desired. In various embodiments, programming interface 109 is a satellite, cable or broadcast television interface to medium 115, although other embodiments may provide alternate or additional interfaces as desired. Programming interface 126 therefore interacts with an antenna, cable interface or other receiver hardware to receive transport stream 110 via medium 115. Programming interface 126 may also provide tuning, demodulation, decryption and/or other functions as desired.

Display interface 128 is any physical and/or logical interface to a television or other display 142. Some types of receivers 120 may incorporate a built-in display 142, such as the display in a laptop or other portable computer, a media player, a portable television and/or the like. In other embodiments wherein receiver 120 provides video output signals 130 to an external display 142, such signals 130 may be provided in any compatible format. In embodiments wherein display 142 is a conventional television, for example, display interface 128 may provide video and audio output signals in any conventional format, such as component video, S-video, High-Definition Multimedia Interface (HDMI), Digital Visual Interface (DVI), IEEE 1394, and/or any other formats as desired.

Various embodiments may allow the receiver to automatically or manually (e.g., in response to a viewer input) obtain additional information from a server or other system 148 that is accessible via a network 146. Such information may be identified by uniform resource locators (URLs) or other hyperlink located within the supplemental information stream 105, 106 as desired. Content referenced by the hyperlinks may be obtained by a browser application or the like executing on receiver 120. A browser program could execute within controller 121, for example, to obtain content from a server 148 that is identified by a hyperlink contained within supplemental information provided within a stream 105, 106.

To that end, receiver 120 may include an appropriate network interface 132 that operates using any implementation of protocols or other features to support communication on network 146. Network 146 is any digital or other communications network capable of transmitting messages between senders (e.g., receiver 120) and receivers (e.g., computing system 148). In various embodiments, network interface 210 supports conventional LAN, WAN or other protocols (e.g., the TCP/IP or UDP/IP suite of protocols widely used on the Internet) to allow receiver 120 to communicate on network 146 as desired. Network interface 210 typically interfaces with network 146 using any sort of LAN adapter hardware, such as a conventional network interface card (NIC) or the like provided within receiver 120.

Some implementations may allow downloading or transfer of supplemental information to a mobile phone, computer, personal digital assistant, memory, or other external device 144. This feature may be useful, for example, in downloading recipes to a phone or other device that can be carried to the supermarket, or for any other purpose. To facilitate data transfers to the device 144, receiver 120 may include a direct interface 131, such as any physical, logical and/or other features that can be used to interface with an external computer, mobile phone, storage medium or other device 144 as appropriate. In various embodiments, direct interface 131 is a universal serial bus (USB), IEEE 1394 ("Firewire") or other standard wired interface that allows viewers to transfer data between receiver 120 and device 144 over a cable or other physical connection. Other embodiments may additionally or alternately implement direct interface 131 with a wireless receiver, transceiver or other module capable of wirelessly exchanging data with device 144. Examples of wireless direct interfaces 131 could include conventional IEEE 802.15.4 ("ZIGBEE") or other wireless local area network (WLAN) transceivers, including transceivers that implement other wireless signaling techniques such as IEEE 802.15.1 ("BLUETOOTH"), IEEE 802.11 ("WI-FI") and/or the like. Other embodiments may transfer supplemental information via network interface 132, or via other techniques as desired.

In operation, then, receiver 120 suitably receives the transport stream 110 that includes multiplexed elementary streams 102-106, as appropriate. The various streams 102-106 are identified, demodulated, and provided to the viewer as appropriate.

Figure 2:
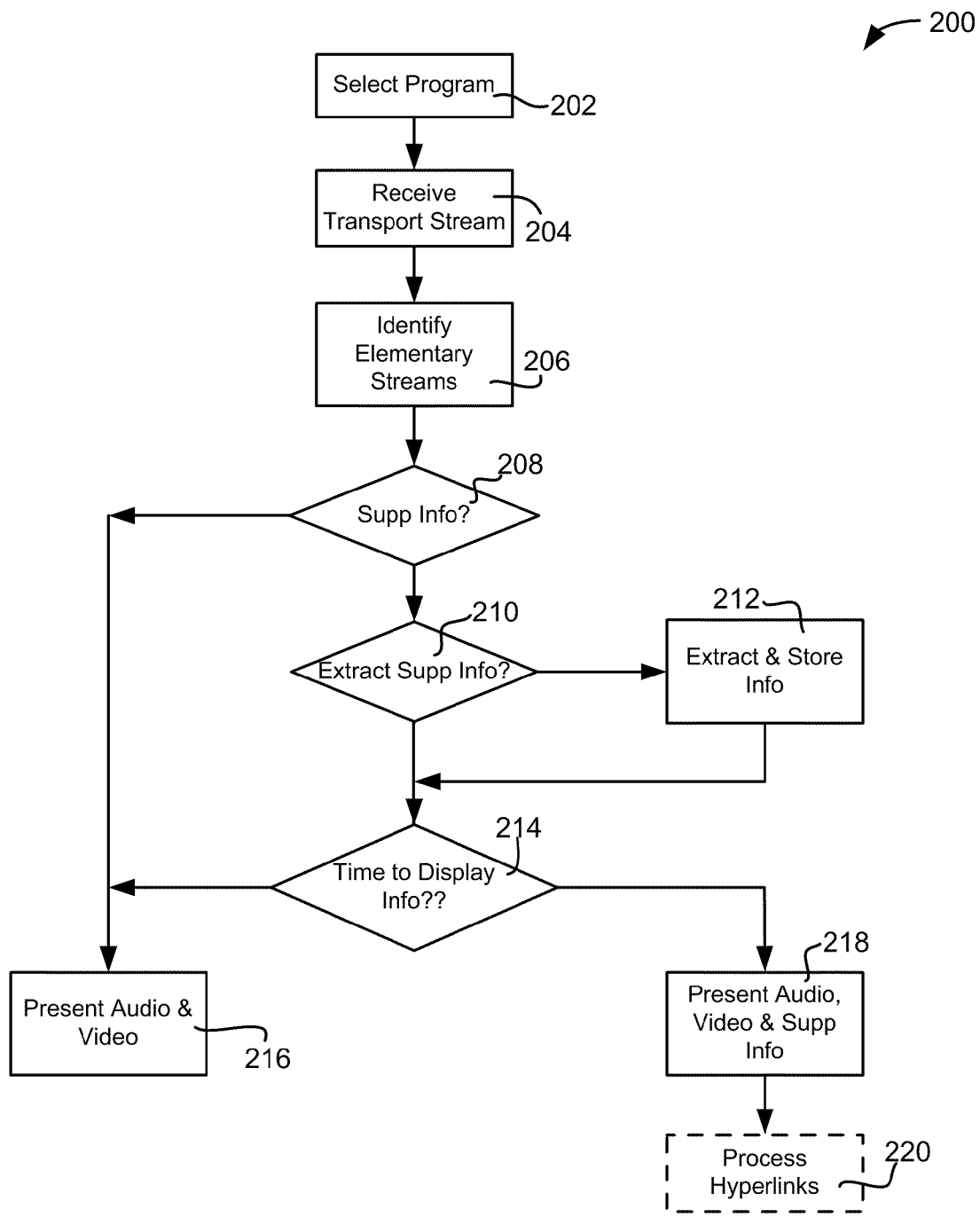
FIG. 2 is a flowchart of an exemplary process for processing supplemental information.

FIG. 2 shows an example of a process 200 that could be executed by a receiver 120 to provide the supplemental information 147 to the viewer in any number of different ways. As shown in FIG. 2, the receiver 120 appropriately responds to viewer inputs to select a television or other media program (function 202), to receive a digital transport stream no that contains the program content of the selected program (function 204), to identify the elementary streams (function 206) to be processed (including any supplemental content streams 105, 106), and to process the audio, video and/or supplemental content contained within the identified streams as desired (functions 208-220). Providing the supplemental content 147 to the viewer may involve, in various embodiments, presenting the content 147 in a window or overlay on display 142 (function 218). Other embodiments may additionally or alternately extract the supplemental content for storage to an internal or external storage device (function 212), as desired.

Programs for viewing or other processing may be selected in any manner (function 202). In many cases, receiver 120 selects a television program, movie, media stream or other programming in response to viewer inputs received via a remote control or other user interface as desired. Such viewer inputs may be received at input/output module 129 or elsewhere in response to viewer interaction with an EPG or other interface feature, as desired. In various embodiments, viewers are able to select programming from program interface 126 (e.g., terrestrial, cable, DBS or other broadcast programming), from programs previously stored in DVR 141 via storage interface 127, from streaming video received from a source on network 146 via network interface 132, from a file server or storage device directly connected via direct connection 131, and/or from any other source.

The selected program is then received in any manner (function 204). In various embodiments, a transport stream 110 that contains the program content is identified from a program guide or other table, and that transport stream is received as appropriate. Programs received via broadcast channel 115, for example, will typically be received by controlling program interface 126 to tune an RF, cable or other receiver to a desired channel where the selected program is being broadcast. This received signal is typically demodulated, as appropriate, to extract the digital transport stream 110 containing the various elementary streams that contain the program content. As noted above, digital transport stream no may be alternately obtained from DVR 141, network 146, device 144 or any other source as desired.

The received transport stream no is then processed as appropriate to identify the desired elementary streams 102-106 that contain the desired program content, including any supplemental content (function 206). The particular streams 102-106 are identified though information conveyed in a PMT or other data contained with the transport stream 110, in supplemental information otherwise transmitted via channel 115 (or another channel, such as network 146), and/or other information available to receiver 120 via an EPG or other source. In various embodiments, the EPG associated with receiver 120 is regularly updated to contain information that identifies the particular streams 102-106 of each available transport stream no according to PIDs or other identifiers, as appropriate.

The particular streams 102-106 are extracted in any manner. In various embodiments, receiver 120 identifies video content (e.g., stream 102 in FIG. 1), audio content (e.g., streams 103, 104 in FIG. 1) and/or supplemental content (e.g., streams 105, 106) according to the PIDs or other identifiers associated with each stream. Each identifier is known from a PMT or other index file provided with metadata 107, via EPG data separate from stream 110, or from any other source. If the transport stream no contains multiple elementary streams providing similar content, one of the available streams may be selected according to viewer preferences, inputs from the viewer, or other factors as desired. A transport stream no may include multiple streams 103, 104 containing similar audio tracks in different encoding formats or different languages, for example, that may be selected according to user preferences, equipment capabilities, or other factors as desired. Supplemental information streams 105, 106 may be similarly provided in different languages, to provide differing levels of detail, or the like. These streams 105, 106 may be similarly selected based upon user preferences that are previously stored within receiver 120, that are manually obtained from the viewer, or that are otherwise available. Further, some embodiments may allow simultaneous or sequential processing of multiple supplemental content streams 105, 106. To provide just one example, one stream 105 may be presented on display 142 as the video programming 145 progresses, and a second stream 106 having additional or differently-formatted information may be stored for later access by the viewer. The supplemental stream 106 may further contain media content, software, or any other information that may be stored, transferred to an external device 144, or otherwise made available to the viewer apart from display 102.

In some embodiments, a "pay per view" supplemental information service could be further provided on one or more supplemental streams 105, 106 by encrypting or otherwise encoding the particular supplemental information stream 105, 106 so that only certain viewers are able to access the stream. This feature could be used to limit access to supplemental content, or to otherwise restrict distribution of the supplemental content contained in the transport stream 110. In various embodiments, one supplemental stream may contain advertisements that are suppressed in another stream that is only available to subscribers who have paid an additional fee or who have otherwise obtained access to the enhanced supplemental content contained in the secure stream. Encryption keys or other security mechanisms used to access the secure stream may be provided, for example, using an EPG or other feature associated with receiver 120. EPG data transmitted via broadcast channel 115, for example, could contain a list of receivers 120 that are approved to receive and decode the secure stream 105, 106. In other embodiments, receiver 120 suitably queries a service (e.g., broadcaster 101 or a service on network 146) to obtain a key or other credential necessary to access the protected content 105, 106. Similar concepts could be used to distribute media content, software or other information within the supplemental stream 105, 106. Many embodiments will omit these features entirely, or will restrict access to elementary streams 105, 106 using any other techniques.

Receiver 120 selects packets within the digital transport stream 110 that are identified as being associated with one of the desired streams. If the transport stream 110 is a conventional MPEG stream, for example, the desired packets can be recognized from the PIDs contained within each packet. Typically, receiver 120 retains the desired packets by recognizing the PIDs or other identifiers associated with the desired elementary streams. Packets having other PIDs are simply discarded, as appropriate. In the example shown in FIG. 1, for example, the viewer may wish to obtain video stream 102, audio stream 103, and supplemental stream 105 based upon language or other preferences. These streams, along with metadata 107, will typically be identified from their PID or other identifier for further processing in this example, whereas packets associated with streams 104 and 106 will by simply discarded.

If the transport stream 110 does not contain supplemental information 147, then the video, audio and/or other streams 102-104 can be processed by receiver 120 using conventional techniques (function 216). If the transport stream 110 contains one or more streams 105, 106 of supplemental information (function 208), however, the supplemental content 147 may be made available to the viewer in any number of different ways, as represented by function 210 in FIG. 2.

In various embodiments, supplemental information 147 is simply extracted and stored for later use (function 212). The particular processing in function 212 used to extract and store the supplemental information will vary depending on the type of information contained within the stream 105, 106. In various embodiments, the supplemental information is simply ASCII or similar text that can be readily stored in a conventional file or the like. In other embodiments, the extracted text contained within the file will be formatted in a markup language (e.g., hypertext markup language (HTML), extensible markup language (XML) or the like) to permit formatted viewing within a browser or other viewing application on receiver 120, device 144, or any other device as desired. In still other embodiments, some or all of the supplemental information within stream 105, 106 may be formatted as an executable file, media file, binary file or the like. Such files may be further encoded prior to transport and decoded by receiver 120 as needed.

In many embodiments, the supplemental information 147 is simply presented to the viewer on display 142 along with the audio and video content of the selected program. Supplemental information 147 may be presented as an overlay that covers a portion of the video content 145, as shown in FIG. 1. Other embodiments will display supplemental information 147 in a separate window, or in any other manner as desired. In some implementations, supplemental information 147 is activated or deactivated by the viewer to avoid obscuring a portion of video content 145 when presentation of the supplemental information 147 is not desired. The imagery presented on display 142 may be rendered by display processor 125 in some embodiments to produce signals 130 that incorporate supplemental content 147 in any desired manner.

As noted above, some implementations may provide supplemental content 147 within a web browser or other application that is able to process hyperlinks contained within the supplemental content stream 105, 106 (function 220). Such hyperlinks may contain uniform resource locators (URLs) or other addresses associated with content on a service 148 on network 146, for example. Hyperlinks may be traversed in response to viewer inputs, as desired. In other cases, receiver 120 may access the hyperlinks without express input from the viewer to automatically obtain additional content that may be provided on display 142 or otherwise made available to the viewer.

As further discussed below, various embodiments allow different "chapters" or other files contained within the supplemental content streams 105, 106 to be presented at times that are related to the presentation of the video and/or audio content (function 214). Multiple "chapters" of information may be displayed or otherwise made available as the program progresses, for example, to prevent viewers from "looking ahead" or to improve the relevance of information presented at any particular time. Coordinated timing may be achieved in some embodiments by referencing the program clock reference (PCR) within the transport stream 110 (e.g., using presentation time stamps (PTSs) contained within the program stream), or by referencing the elapsed time since the beginning of the program, or in any other manner. Additional detail about chaptered or other time-synchronized presentation of supplemental information 147 is described below with reference to FIG. 4.

The various functions, method steps and other features shown in FIG. 2 may be performed by any hardware, software and/or firmware logic stored in any tangible storage medium within receiver 120, including any sort of optical, magnetic or other storage hardware. In some embodiments, the various functions of process 200 are implemented using software or firmware logic that is stored within a flash memory or ROM (e.g, memory 123) and executed by controller 121 executing on SoC 133, processor 122 and/or other processing hardware within receiver 120. Other embodiments, however, will execute one or more functions on other processing servers, circuits or other logic located external to receiver 120. The various functions shown in FIG. 2 are exemplary, and various practical embodiments may include other functions, additional functions and/or functions organized in ways other than that shown in the example of FIG. 2.

FIG. 3 illustrates an exemplary time-multiplexed transport stream 110 that includes any number of packets 301-309. As noted above, the various packets may be formatted as conventional MPEG packets, or the like, that may be sequentially transmitted in a transport stream 110 as desired. The example illustrated in FIG. 3 shows each packet 301-309 having an identifier 315 (e.g., a PID or similar code) that identifies the stream 102-106 from which the packet 301-309 is created. Each packet 301-309 also has a payload field 310, 312, 314 that is able to carry appropriate content for a particular stream 102-106. In the example of FIG. 3, packets 301 and 307 are packets containing metadata 107 (such as PCR or similar clock reference 316, a program mapping information 318 and/or the like) that are identified by a common identifier 315 ("PID=1" in this example). Similarly, packets 302, 304, 306 and 308 contain video data from stream 102, and are identified in this example with a different identifier 315 (e.g., "PID=2"), and with a payload field 310 formatted to transport video content. Audio content from stream 103 is provided within packet 303 having yet another identifier 315 (e.g., "PID=3") and a payload 312, and supplemental data from stream 105 is provided in packets 305 and 309, which have yet another unique identifier 315 (e.g., "PID=4") and a payload field 314 suitable for transporting raw text, formatted text, binary and/or other supplemental content as desired.

The various packets 301-309 may be sequenced and arranged in any manner. Typically, video content from stream 102 will consume the greatest share of bandwidth, so typically these packets 302, 304, 306, 308 will make up the largest share of transport stream 110. Packets containing audio content and supplemental information may be inserted within the transport stream 110 as space is available, according to conventional MPEG or other multiplexing techniques.

As noted above, various embodiments may use a common timing scheme to synchronize or otherwise coordinate the presentation of supplemental information 147 with video content 145, audio content and/or the like. In a exemplary implementation that uses MPEG constructs, for example, the various elementary streams 102, 103, 105 may be coordinated in time with each other using conventional program clock reference (PCR) and/or presentation time stamp (PTS) structures. In a conventional MPEG stream 110, PCR data 316 is provided every 100 ms or so in a packet 307 having a known PID 315 to allow the receiver 120 to create an accurate clock. Further, each stream 102-106 within the MPEG multiplex no typically includes PTS data that provides an offset or other reference relative to the PCR so that the video, audio and supplemental data streams 102-106 can be synchronized or otherwise time coordinated as desired.

In some implementations, supplemental content streams 105-106 may contain multiple files or other data blocks that can be separately processed or otherwise made available to the viewer at different times. Such files may not be synchronized using PCR/PTS data, but may instead reference a simple clock that identifies the time since the program began, or any other reference point within the program. FIG. 4, for example, shows an exemplary television or other media program 400 that includes video content on elementary stream 102, audio content on elementary stream 103, and supplemental information 147 on elementary stream 105. The various streams 102, 103, 105 may be extracted from a multiplexed transport stream 110, as described above.

In the example of FIG. 4, the supplemental content 147 is provided in three separate files 411, 412 and 413. Each file may be sequentially transmitted on stream 105, and each file may be individually or separately processed as appropriate. In various embodiments, the various files 411, 412, 413 represent "chapters" of information that may be relevant to different portions of the video and audio programming. File 411 may represent introductory matter, for example, whereas file 412 may represent information more relevant to the middle portion of the program, and file 413 may represent a summary, recap or other information that is most useful toward the end of the program 400.

Display of the various files 411-413 may be coordinated in any manner. In the example of FIG. 4, file 411 is available between times 401 and 402 of program 400, file 412 is available between times 403 and 404, and file 413 is available after time 413. Note that the various times 401-405 may be identified by PCR/PTS data within the transport stream 110 in some implementations, although other implementations may identify the relevant times 401-405 using EPG data, metadata 107, a file or other information contained within stream 105, or the like. Times 401-405 need not be referenced to the MPEG clocking data, but may simply indicate times since the beginning of the program 400, or since any other convenient reference. Supplemental information 147 contained within files 401-403 may be available after the program 400 is complete; indeed, many embodiments may store information 147 for later retrieval, as described more fully above.

The timing schedule for presenting files 411-413 may be used to enhance the viewer experience in many different ways. Supplemental information 147 may be suppressed during commercials (e.g., between times 402-403 and 404-405 in FIG. 4) so that the viewer is not distracted during the commercial message. Alternately, supplemental information may be provided during commercials so that the viewer is able to review additional information or to access a hyperlink to additional information about the advertised product.

The above discussion therefore describes a number of exemplary embodiments for making supplementary information 147 available to a viewer using an elementary stream 105, 106 that is provided in the same transport stream no as the audio and visual content of the program 400. Supplementary information 147 may be made available to the viewer by presenting the information on a display 142, by extracting and storing the information for later retrieval by the viewer, by transferring the information to a portable device 144, or in any other manner.

Further, as noted above, because the supplemental information 147 is provided within the transport stream itself, the information 147 is readily stored within a DVR 141 or the like for subsequent retrieval and playback of the program 400. For DVRs that store the entire transport stream 110, the supplemental information streams 105, 106 are simply stored with the remainder of the stream 110. In DVRs that store rendered or otherwise processed copies of the received stream, the supplemental information 147 may be made available within the rendered imagery, or extracted and stored for subsequent retrieval just as if the program were received for live viewing on display 142. The supplemental information 147 may be similarly placeshifted (e.g., to a portable computer, mobile phone or other device accessible on network 146) with the audio and video content within the transport stream 110 using equivalent concepts.

As noted at the outset, streams 105, 106 of supplemental information 147 may be particularly useful in "do-it-yourself" or other educational programming such as cooking shows, home improvement shows, how-to shows, self-improvement shows, health or fitness shows, or the like. Equivalent concepts may be used to provide supplemental information 147 associated with any other types of programming, however, including pay-per-view programs, commercials, sports programming, movies, and/or many others.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The term "exemplary" is used herein to represent one example, instance or illustration that may have any number of alternates. Any implementation described herein as exemplary is not necessarily to be construed as preferred or advantageous over other implementations.

What is claimed is:

1. A method to present a television program to a viewer, the method comprising:

receiving a digital transport stream associated with the television program, wherein the digital transport stream comprises a multiplex of a first elementary stream and a second elementary stream, wherein the first elementary stream conveys video content associated with the television program and the second elementary stream conveys supplemental information that summarizes at least a portion of the television program;

identifying the first elementary stream and the second elementary stream in the digital transport stream;

processing the first elementary stream to thereby present the video content associated with the television program to the viewer; and making the supplemental information from the second elementary stream available to the viewer,
wherein:
each of the first and second elementary streams references a common timing scheme,
the supplemental information is made available to the viewer on a display at the same time as the video content based upon the common timing scheme,
the supplemental information comprises a plurality of files conveyed within the second elementary stream,
each of the plurality of files is associated with a respective portion of the television program using the common timing scheme, and
each of the plurality of files represents a chapter of information relevant to the respective portion, at least one such chapter of information comprising a summary or recap of the television program, the summary or recap having been generated prior to receiving the digital transport stream and being included as part of the second elementary stream.

2. The method of claim 1 wherein the digital transport stream is an MPEG transport stream, wherein each of the first and second elementary streams is an MPEG packetized elementary stream that is identified within the MPEG transport stream by a unique packet identifier, and wherein the common timing scheme references an MPEG program clock reference.

3. The method of claim 1 wherein the supplemental information comprises a plurality of files conveyed within the second elementary stream, and wherein each of the plurality of files is associated with a respective portion of the television program.

4. The method of claim 3 wherein each of the plurality of files is made available to the viewer by presenting the supplemental information contained in the file to the viewer during the associated portion of the television program.

5. The method of claim 1 wherein making the supplemental information available to the viewer comprises extracting at least a portion of the supplemental information from the second elementary stream and storing the extracted portion of the supplemental information.

6. The method of claim 5 further comprising transferring the extracted portion of the supplemental information to an external device.

7. The method of claim 1 wherein the receiving comprises tuning a receiver to receive the digital transport stream from a broadcast source.

8. The method of claim 1 wherein the receiving comprises retrieving the digital transport stream from a digital video recorder.

9. The method of claim 1 wherein the television program is an instructional program that presents instructional material to the viewer, and wherein the supplemental information summarizes the instructional material presented during the instructional program.

10. The method of claim 1, wherein at least another one of such chapters of information comprises introductory matter related to the television programming to be presented at a beginning portion of the television programming.

11. A system to provide supplemental information associated with video content of a television program to a viewer, the system comprising:
a programming interface configured to receive a transport stream associated with the television program, wherein the transport stream comprises a first elementary stream that conveys the video content of the television program and a second elementary stream that conveys the supplemental information, and wherein the supplemental information summarizes at least a portion of the television program;
a display interface configured to provide output signals that represent the video content to a display; and
a controller configured to identify and extract the first elementary stream from the transport stream, to process the first elementary stream to thereby generate the output signals representing the video content for presentation to the viewer on the display, and to make the supplemental information from the second elementary stream available to the viewer,
wherein the supplemental information comprises a plurality of files, and wherein each of the plurality of files is associated with a portion of the television program, wherein the controller is further configured to present the supplemental information from each of the plurality of files on the display during the associated portion of the television program, and wherein each of the plurality of files represents a chapter of information relevant to the respective portion, at least one such chapter of information comprising a summary or recap of the television program, the summary or recap having been generated prior to receiving the transport stream and being included as part of the second elementary stream.

12. The system of claim 11 wherein the supplemental information is presented in a separate window from the video content.

13. The system of claim 11 further comprising a digital video recorder, wherein the controller is configured to initially receive the transport stream via the programming interface and to store the transport stream in the digital video recorder, and to subsequently retrieve the transport stream from the digital video recorder to thereby process the first and second elementary streams and to provide the supplemental information.

14. The system of claim 11 further comprising a direct interface to an external device, wherein the controller is configured to provide the supplemental information to the viewer by extracting the supplemental information from the second elementary stream and transferring the extracted supplemental information to the external device via the direct interface.

15. The system of claim 11 further comprising a network interface to a network, wherein the supplemental information comprises a hyperlink to a server available via the network, and wherein the controller is configured to communicate with the server via the network in response to an input received from the viewer.

16. The system of claim 11, wherein at least another one of such chapters of information comprises introductory matter related to the television programming to be presented at a beginning portion of the television programming.

* * * * *